(12) United States Patent
Shae et al.

(10) Patent No.: US 8,875,131 B2
(45) Date of Patent: Oct. 28, 2014

(54) SPECIFICATION OF ENVIRONMENT REQUIRED FOR CROWDSOURCING TASKS

(75) Inventors: Zon-Yin Shae, South Salem, NY (US); Maja Vukovic, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 863 days.

(21) Appl. No.: 12/949,175

(22) Filed: Nov. 18, 2010

(65) Prior Publication Data
US 2012/0131572 A1 May 24, 2012

(51) Int. Cl.
*G06F 9/455* (2006.01)
*G06Q 10/06* (2012.01)

(52) U.S. Cl.
CPC .... G06F 9/45558 (2013.01); G06Q 10/063112 (2013.01); *G06F 2009/45562* (2013.01)
USPC .......................................................... 718/1

(58) Field of Classification Search
None
See application file for complete search history.

(56) References Cited

U.S. PATENT DOCUMENTS 8,195,498 B2 * 6/2012 Vojnovic et al. ............. 705/7.14
8,219,987 B1 * 7/2012 Vlaovic et al. ................... 718/1
8,290,998 B2 * 10/2012 Stienhans et al. ............. 707/827
2011/0083122 A1 * 4/2011 Chen et al. .................... 717/124
2012/0029963 A1 * 2/2012 Olding et al. ................ 705/7.14

OTHER PUBLICATIONS

"What is TopCoder?," TopCoder, Inc., dated Feb. 8, 2010, 2 pages. Accessed Mar. 20, 2013.
"Amazon Mechanical Turk," Amazon Web Services, Copyright 2010, 4 pages. Accessed Mar. 11, 2010.
Vukovic, M., "Crowdsourcing for Enterprises," 2009 Congress on Services—I, Jul. 2009, pp. 686-692.

* cited by examiner

*Primary Examiner* — Meng An
*Assistant Examiner* — Eric C Wai
(74) *Attorney, Agent, or Firm* — Yee & Associates, P.C.; Louis J. Percello

(57) ABSTRACT

Embodiments of the invention are associated with crowdsourcing, wherein a computing environment comprising all of the tools and other resources required to perform a specified task can be made available to all prospective participants, as a virtual machine image. One embodiment of the invention is directed to a method associated with a particular task that is provided by a task requester, wherein the particular task is to be performed by means of a crowdsourcing process. The method comprises the steps of selecting a plurality of participants, wherein each participant of the plurality is qualified to perform the particular task, and specifying a computing environment that comprises a set of resources, wherein each resource is required to perform the particular task. A virtual machine image that contains each of the resources of the set is constructed, and is then made available for use by each selected participant of the plurality.

13 Claims, 3 Drawing Sheets

SPECIFICATION OF ENVIRONMENT REQUIRED FOR CROWDSOURCING TASKS

BACKGROUND OF THE INVENTION

1. Field of the Invention

The invention disclosed and claimed herein pertains generally to crowdsourcing, wherein a number of software service providers are each engaged online to perform a specified development or other task. More particularly, the invention pertains to crowdsourcing of the above type, wherein a computing environment, comprising all tools and other resources required to perform the task, is made available to each task participant.

2. Description of Related Art

As is known by those of skill in the art, Web 2.0 Technologies have significantly enhanced interactive information sharing and collaboration over the Internet. This has enabled crowdsourcing to develop, as an increasingly popular approach for performing certain kinds of important tasks. In crowdsourcing, a large group of organizations, individuals, and other entities that desire to provide pertinent services, such as a specific community of providers or the general public, are invited to participate in a task that is presented by a task requester. Examples of such tasks include, but are not limited to, developing specified software components or the like.

At present, a crowdsourcing platform may serve as a broker or intermediary between the task requester and software providers who are interested in undertaking or participating in task performance. Crowdsourcing platforms generally allow requesters to publish their challenges and tasks, and further allow participating providers that are successful in completing the task to receive specified monetary awards or other incentives. Top Coder and Mechanical Turk are examples of currently available platforms.

For tasks that require development of a software component or other product, the requester will typically specify the particular types of tools and other resources that each participant must use, in order to perform the task successfully. These specified tools and resources collectively comprise or define the development environment for the component. Also, if the task requires testing of the developed component, particular tools and other resources may also be specified for carrying out the test procedures. These specified tool and resource requirements collectively define the test environment for the component.

While specified development and test environments are clearly necessary, such requirements often act to limit or restrict those who can participate in a crowdsourcing task. If an individual or organization that desires to participate in performing the task has access to the development and test environments, there would, of course, be no problem. However, those without access would face a barrier that generally would prevent their participation, as well as quality of the submission. In the absence of a common environment, the participants would not all be working on the same baseline. As a result, the number of available participants for the crowdsourcing task could be significantly reduced.

SUMMARY OF THE INVENTION

Embodiments of the invention are associated with crowdsourcing, wherein all of the tools and other resources required to perform a specified task can be made available to all prospective participants. Usefully, resources that comprise required development and test environments, collectively referred to herein as the "computing environment" for the task, are preloaded into a virtual machine image. The virtual machine image is then delivered for use by each person, organization, or other entity that desires to participate in performing the task, and is qualified to be a participant.

One embodiment of the invention is directed to a method associated with a particular task that is provided by a task requester, wherein the particular task is to be performed by means of a crowdsourcing process. The method comprises the steps of selecting a plurality of participants, wherein each participant of the plurality is qualified to perform the particular task, and specifying a computing environment that comprises a set of resources, wherein each resource is required to perform the particular task. A virtual machine image that contains each of the resources of the set is constructed, and is then made available for use by each selected participant of the plurality.

DETAILED DESCRIPTION OF THE EMBODIMENT

Figure 1:
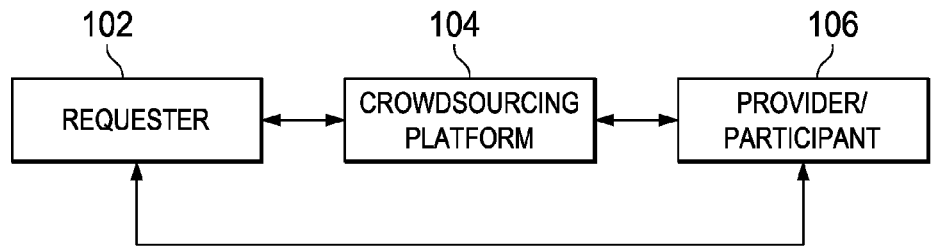
FIG. 1 is a schematic diagram illustrating a crowdsourcing process in accordance with an embodiment of the invention.

As will be appreciated by one skilled in the art, the present invention may be embodied as a system, method or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product embodied in any tangible medium of expression having computer usable program code embodied in the medium.

Any combination of one or more computer usable or computer readable medium(s) may be utilized. The computer-usable or computer-readable medium may be, for example but not limited to, an electronic, magnetic, optical, electro-magnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CDROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to wireless, wireline, optical fiber cable, RF, etc.

Computer program code for carrying out operations of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The present invention is described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer program instructions may also be stored in a computer-readable medium that can direct a computer or other programmable data processing apparatus to function in a particular manner, such that the instructions stored in the computer-readable medium produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide processes for implementing the functions/acts specified in the flowchart and/or block diagram block or blocks.

Referring to FIG. 1, there is shown a schematic diagram that illustrates a crowdsourcing process, and further illustrates respective entities engaged in such process. Generally, requester 102 is an entity such as a business or other enterprise that desires to have a particular task performed. The task, for example, could be developing a specified software component or the like. Requester 102 clearly specifies the task requirements description, and provides acceptance criteria to define successful task completion. Requester 102 could also specify start and end dates, and crowdsourcing incentives or rewards. These task elements are described hereinafter in further detail, in connection with FIG. 4.

Requester 102 initiates the crowdsourcing process shown in FIG. 1 by submitting a request for performance of the particular task to a crowdsourcing platform 104. The platform 104 is a broker that presents or publishes the task request to providers of software services or the like, who may be interested in becoming participants 106 in performing the task, and have the capability to do so. Crowdsourcing platform 104 may use one of a number of modes to make the request known to prospective providers, and to ultimately select the most successful provider. These modes could include advertising the requested task in an appropriate marketplace, or enabling providers to submit bids for the task. Another mode would be to establish a competition, wherein different participants 106 would each submit their task performance results. The platform 104 would then select the best result, based on criteria provided by requester 102.

The platform 104 can also be used to validate or authenticate interested providers, to ensure that only providers who are qualified to perform the task are selected to become participants 106. Platform 104 may further be used to provide a number of administrative functions, as a broker between requestors and providers or solvers. These functions include certain negotiations, and handling disputes of results and awards. For a given task, platform 104 may be furnished with standards or criteria that it uses to determine whether each prospective provider is or is not qualified to be a participant 106. Platform 104 can be used further to ensure that participants successfully complete the requested task, that required payments are made to both participants 106 and requestor 102, and to track digital reputations of both participants and requestors.

It is anticipated that tasks to be performed by the crowdsourcing process of FIG. 1 will generally have very specific development requirements, and/or test requirements. These development and test requirements are set forth by the requestor 102, and collectively comprise or define the computing environment for the task. In a useful embodiment of the invention, described hereinafter in further detail, all of the requirements of the computing environment are loaded, or instantiated and coded into a virtual machine image. The virtual machine image is then delivered by platform 104 to, or is otherwise made available for the use of, each participant 106 that is qualified and selected to engage in performing the task.

Figure 2:
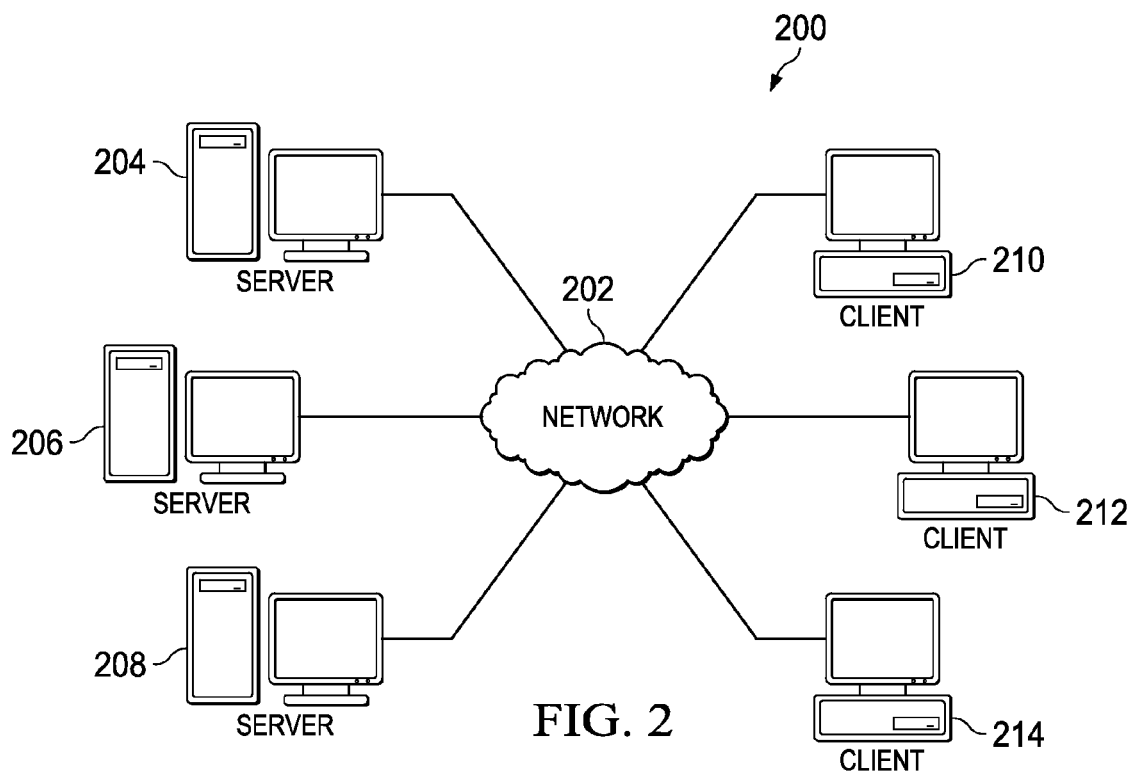
FIG. 2 is a block diagram showing a system network environment in which embodiments of the invention may be used.

Referring to FIG. 2, there is shown a block diagram of a systems network 200, comprising data processing systems in which embodiments of the present invention may be implemented. Systems network 200 is a network of computers and other components that includes network 202, the medium used to provide communication links between various devices and computers connected together within systems network 200. Network 202 may include connections such as wire, wireless communication links, or fiber optic cables.

Components of systems network 200 further include servers exemplified by servers 204-208, and clients exemplified by clients 210-214. Requester 102 of FIG. 1 could, for example, comprise server 204 or client 210, and platform 104 of FIG. 1 could comprise server 206. Participant 106 could comprise server 208 or client 212. Network data processing system 200 may include additional servers, clients, and other devices not shown.

In the depicted example, network 202 of systems network 200 could be the Internet, including a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. FIG. 2 is intended as an example, and not as an architectural limitation, for different embodiments of the present invention.

Figure 3:
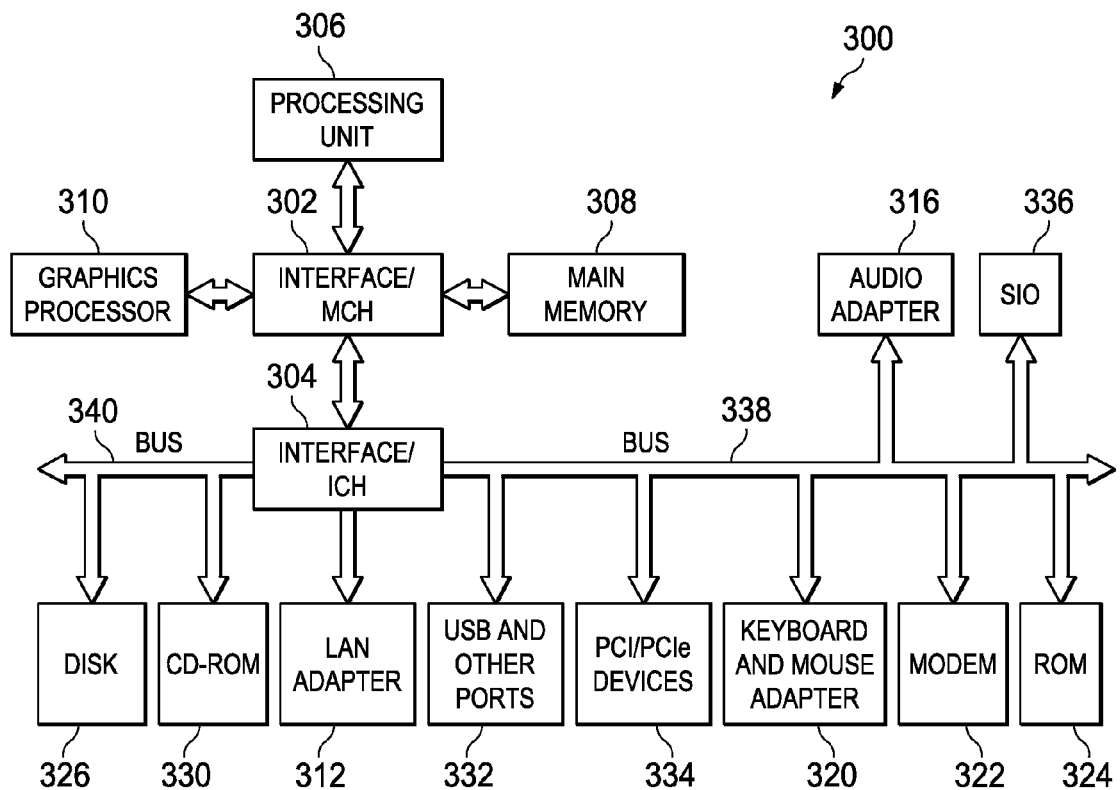
FIG. 3 is a block diagram showing a data processing system which may be used as one or more of the components of the embodiment of FIG. 1.

With reference now to FIG. 3, a block diagram of a data processing system is shown in which aspects of the present invention may be implemented. Data processing system 200 is an example of a computer, such as server 204 or client 210 in FIG. 2, in which computer usable code or instructions implementing the processes for embodiments of the present invention may be located.

In the depicted example, data processing system 300 employs a hub architecture including north bridge and memory controller hub (NB/MCH) 302 and south bridge and input/output (I/O) controller hub (SB/ICH) 304. Processing unit 306, main memory 308, and graphics processor 310 are connected to NB/MCH 302. Graphics processor 310 may be connected to NB/MCH 302 through an accelerated graphics port (AGP).

In the depicted example, local area network (LAN) adapter 312 connects to SB/ICH 304. Audio adapter 316, keyboard and mouse adapter 320, modem 322, read only memory (ROM) 324, hard disk drive (HDD) 326, CD-ROM drive 330, universal serial bus (USB) ports and other communication ports 332, and PCI/PCIe devices 334 connect to SB/ICH 304 through bus 338 and bus 340. PCI/PCIe devices may include, for example, Ethernet adapters, add-in cards, and PC cards for notebook computers. PCI uses a card bus controller, while PCIe does not. ROM 324 may be, for example, a flash binary input/output system (BIOS).

HDD 326 and CD-ROM drive 330 connect to SB/ICH 304 through bus 340. HDD 326 and CD-ROM drive 330 may use, for example, an integrated drive electronics (IDE) or serial advanced technology attachment (SATA) interface. Super I/O (SIO) device 336 may be connected to SB/ICH 304.

An operating system runs on processing unit 306 and coordinates and provides control of various components within data processing system 300 in FIG. 3. As a client, the operating system may be a commercially available operating system such as Microsoft® Windows® XP (Microsoft and Windows are trademarks of Microsoft Corporation in the United States, other countries, or both). An object-oriented programming system, such as the Java™ programming system, may run in conjunction with the operating system and provides calls to the operating system from Java™ programs or applications executing on data processing system 300 (Java is a trademark of Sun Microsystems, Inc. in the United States, other countries, or both).

As a server, data processing system 300 may be, for example, an IBM® eServer™ pSeries® computer system, running the Advanced Interactive Executive (AIX®) operating system or the LINUX® operating system (eServer, pSeries and AIX are trademarks of International Business Machines Corporation in the United States, other countries, or both while LINUX is a trademark of Linus Torvalds in the United States, other countries, or both). Data processing system 300 may be a symmetric multiprocessor (SMP) system including a plurality of processors in processing unit 306. Alternatively, a single processor system may be employed.

Instructions for the operating system, the object-oriented programming system, and applications or programs are located on storage devices, such as HDD 326, and may be loaded into main memory 308 for execution by processing unit 306. The processes for embodiments of the present invention are performed by processing unit 306 using computer usable program code, which may be located in a memory such as, for example, main memory 308, ROM 324, or in one or more peripheral devices 326 and 330.

In some illustrative examples, data processing system 300 may be a personal digital assistant (PDA), which is configured with flash memory to provide non-volatile memory for storing operating system files and/or user-generated data.

A bus system may be comprised of one or more buses, such as bus 338 or bus 340 as shown in FIG. 3. Of course, the bus system may be implemented using any type of communication fabric or architecture that provides for a transfer of data between different components or devices attached to the fabric or architecture. A communication unit may include one or more devices used to transmit and receive data, such as modem 322 or network adapter 312 of FIG. 3. A memory may be, for example, main memory 308, ROM 324, or a cache such as found in NB/MCH 302 in FIG. 3.

Figure 4:
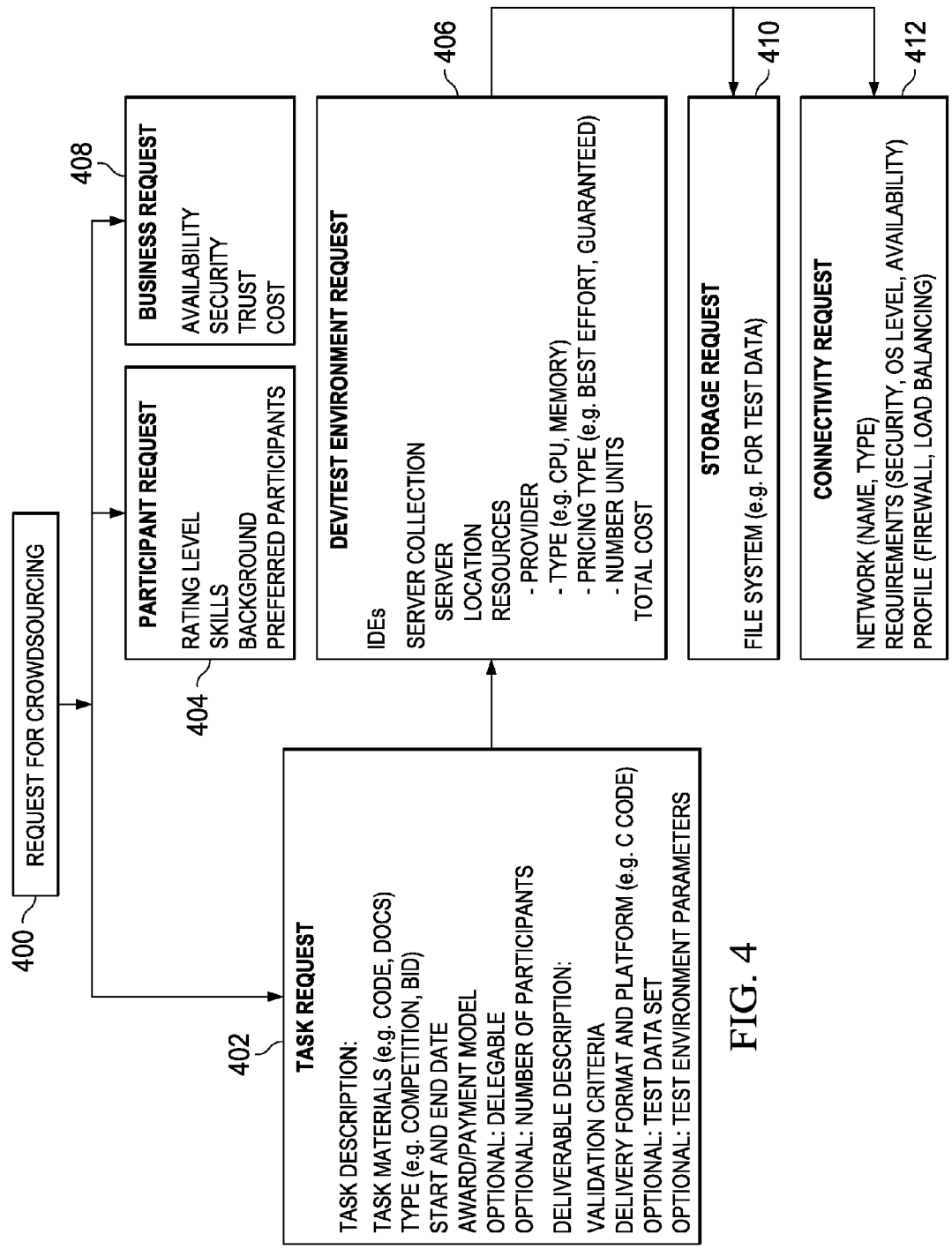
FIG. 4 is a chart depicting respective components of a Request for Crowdsourcing, which is prepared for use in accordance with an embodiment of invention.

It will be appreciated that the crowdsourcing process begins with preparation of a request for crowdsourcing, which is generally carried out by the requester. Referring to FIG. 4, there is shown a Request for Crowdsourcing 400, which comprises request components 402-412. It is to be emphasized that Request for Crowdsourcing 400 is provided by way of example only, and embodiments of the invention are by no means limited thereto.

Component 402 of Request 400 is directed to a Task Request, that is, a specification of the task that is to be performed. Task Request 402 includes two sections, a Task Description and a Deliverable Description. The Task Description sets forth the task deliverables, that is, the tangible result or end product which is to be generated by performance of the task. As one illustrative example, the task deliverable could be a software component that enables users of a community platform to upload an asset to an asset management platform. The Task Description also includes a statement of materials needed for the task. For the above example of developing a component that enables users to upload an asset to a management platform, the Task Description could state that task materials included APIs, and full requirements and use cases were provided.

The Task Description section could also indicate the mode or type that is to be used for the crowdsourcing, such as a competition or bid submission, as described above. The Task Description could further provide for performance start and end dates, and monetary awards or payments. Optional information in the Task Description could be a limit on the number of participants, and whether a participant could team with or delegate to another party or entity. For the above example, the start and end dates could be May 3, 2011 and May 10, 2011, respectively. The monetary award could be $2,000, and the task to be performed could be delegated or could be a joint effort.

The section of Task Request 402 that pertains to the Deliverable Description includes a validation criteria. This is a specification by the requester of a set of test cases that will be used to evaluate the submitted software component or other deliverable, and to compare different submissions. A test case may comprise a specified set of instructions in a specified order. These can be textual descriptions of use cases, or may include test scripts and data sets, depending on task complexity. The Deliverable Description section may further include a delivery format and platform, e.g., C code. Optionally, the Deliverable Description section can specify a test data set and test environment parameters.

For the above example of developing a component to upload an asset, an instance of validation criteria would be the successful upload of an asset from a community site to the asset management site. The asset would be accessible, and correctly categorized in the taxonomy. A delivery format could be specified to be code in the iWidget format, with a full snapshot of the image installation. Test data could be test cases provided in the Task Description.

FIG. 4 further shows a Participant Request component 404. The task requester uses this component to specify any constraints on entities that can participate in the crowdsourcing effort, and to provide criteria for selecting qualified participants. A minimum rating level could be indicated that was based on the reputation of respective entities, such as the number 5 being the highest rating and 1 being the lowest rating. Other constraints could be the available skills of prospective participants, or background information such as their relevant prior experience or history of contributions. The Participant Request could also specify particular participants that were preferred. For the above example, Participant Request 404 could specify a rating level of 4 or above. Required skills would be Java, XML, and JSP, and preferred participants would be N/A.

Referring further to FIG. 4, there is shown a Development and Test Environment Request component 406. In order to precisely control the task environment, the requester specifies the exact development and test requirements for task completion, for a given operating system and middleware level. The requester also specifies all tools and other resources that are required for task completion. These development and test requirements, tools and resources collectively comprise the computing environment for performing the task, as such term is used herein.

FIG. 4 shows that component 406 more particularly includes one or more integrated development environments (IDE). As is known by those of skill in the art, an IDE is a software application that provides comprehensive facilities to computer programmers for software development. Component 406 further specifies a number of details that pertain to the server and other processing resources for the computer environment, which are each required to successfully perform and complete the task. Component 406 also includes the total cost for the server and other resources.

For the above example of developing a component to upload an asset, the computing environment for development and testing could specify the following tools, requirements and other resources:

Operating System: Red Hat Enterprise Linux v5.3
Memory Requirements: 4 GB
Storage Requirements: 32 GB
Software Packages: Eclipse IDE, IBM SDK 6, XAMMP (Apache web server with mySQL installation), Lotus Connections API, Enterprise Directory API, Asset Management API
Access Permission: All
Units: 20 maximum
Total cost: $1000 maximum The Request for Crowdsourcing 400 further includes a Business Request component 408. At this component, the requester specifies cost constraints on delivery of the computing environment to participants. These constraints pertain to availability, security, and trust parameters.

Storage Request component 410 describes the storage requirements for the task to be performed. For example, if it is desired to do load-testing of a particular component being developed, competition participants may require increased amounts of storage.

Connectivity Request component 412 describes network requirements and security and profile requirements for participants. These can be significant, such as when a competition mode crowdsourcing effort is open to an external crowd, or is open to an internal situation that includes contractors. In these situations, the requester may want to impose different security and access controls, and automatically create appropriate IDs. For example, in a scenario wherein participants are developing a widget for internal consumption on a collaboration platform, they will need access to the local enterprise directory. If a participant is an external party, necessary provisions need to be in place for such access, as well as for ensuring the right governance is in place for controlling the crowdsourcing process.

As described above, each participant that is selected to perform a crowdsourcing task must have access to the entire computing environment specified for the task. If the participant is a large organization, all resources of the computing environment may be readily available to it. However, participants such as individuals and smaller organizations, which are otherwise fully qualified to perform the task, may not have access to the complete computing environment.

Accordingly, in an embodiment of the invention, all tools, data, APIs, server requirements, environment parameters, and any other resources required by the computing environment for development and testing, are loaded into a virtual machine image. The virtual machine image is then delivered or otherwise made available to all qualified participants selected to engage in task performance. All participants are thereby enabled to operate at the same baseline in carrying out the task. As is known by those of skill in the art, a virtual machine image can be used to instantiate a virtual machine, which is a software implementation of a computer or other physical machine that can execute instructions.

Figure 5:
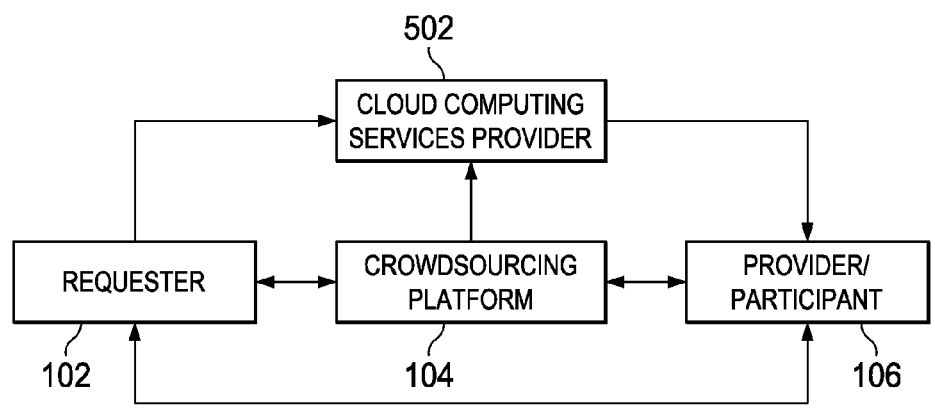
FIG. 5 is a schematic diagram illustrating the use of cloud computing in an embodiment of the invention.

Referring to FIG. 5, there is shown the respective entities associated with crowdsourcing, as depicted in FIG. 1. As described above in connection with FIG. 1, crowdsourcing platform 104 acts as a broker between the requester 102 and each participant 106. In this role, platform 104 typically handles contractual matters between the requester and participants, such as establishing IP governance, legal issues, and compensation for incentives. After these matters have been agreed upon, the crowdsourcing platform 104 delivers the virtual machine image that is loaded with the computing environment, as discussed above, to respective participants 106. In some embodiments of the invention, the virtual machine image could be constructed by the platform 104. In other embodiments, the virtual machine image could be constructed by the requester 102.

Referring further to FIG. 5, there is shown a cloud computing services provider 502 in an interactive relationship with crowdsourcing entities 102-106. While FIG. 5 shows only a single provider 502, there could be more than one provider, e.g. cloud services may be composed from different providers. Cloud computing services of the type furnished by provider 502 are increasingly being used by entities such as businesses and others to service their data processing workloads. Generally, cloud computing customers do not own the physical computing resources or infrastructure of the cloud. Instead, a cloud user entity consumes data processing of resources as a service, in order to process particular workloads that are delivered or routed using the resources and services provided by the cloud computing environment.

In making the invention, it has been recognized that an entity such as cloud computing services provider 502 could have a very useful role in embodiments of the invention. One such role would be to provide processing capacity for use by each participant in implementing the virtual machine image. Thus, it would not matter whether any participant lacked the requisite processing resources. The cloud computing provider 502 could also be used to construct part or all of the virtual machine image for each participant. The virtual machine image could be made available to participants as required, at a platform operated by the cloud computing provider 502. Moreover, while FIG. 5 shows crowdsourcing platform 104 and cloud computing service provider 502 to be separate entities, in a useful embodiment of the invention the functions of platform 104 and provider 502 could be combined or integrated together, into a single entity.

As an example of cloud computing in connection with a crowdsourcing task, the virtual machine image could be used by cloud computing services provider 502 to set up multiple virtual testing machines. If multiple tests were required by the crowdsourcing task, a different test could then be performed on each test machine.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", an and the are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by, or in connection with, the instruction execution system, apparatus, or device.

The medium can be an electronic, magnetic, optical, electromagnetic, infrared, semiconductor system (apparatus or device), or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output, or I/O devices (including but not limited to keyboards, displays, pointing devices, etc.), can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. In association with a particular task of developing a specified software component provided by a task requester, wherein the particular task of developing the specified software component is performed by a crowdsourcing process, a method comprising:

publishing, by a crowdsourcing server, the particular task of developing the specified software component to providers of software services;

receiving, by the crowdsourcing server, bids from the providers of software services to develop the specified software component;

selecting, by the crowdsourcing server, participants based on the received bids from the providers of software services to develop the specified software component, wherein each selected participant is qualified to perform the particular task of developing the specified software component;

specifying, by the crowdsourcing server, a computing environment that comprises a set of resources required to perform the particular task of developing the specified software component, wherein the computing environment includes an integrated software development environment and a test environment for the specified software component;

constructing, by the crowdsourcing server, a virtual machine image that contains each resource of the set of resources of the computing environment required to perform the particular task of developing the specified software component, wherein each selected participant requires specified data processing services to process the virtual machine image to perform the particular task of developing the specified software component, and wherein the specified data processing services are supplied at least in part to at least one of the selected participants by a cloud computing services provider, and wherein the virtual machine image is available to each of the selected participants at a platform operated by the cloud computing services provider;

handling, by the crowdsourcing server, contractual matters between the task requester and the selected participants to develop the specified software component; and responsive to the crowdsourcing server receiving agreement on the contractual matters between the task requester and the selected participants to develop the specified software component, making, by the crowdsourcing server, the virtual machine image available to the selected participants.

2. The method of claim 1, wherein:
the virtual machine image is delivered to each of the selected participants.

3. The method of claim 1, wherein:
the crowdsourcing server is associated with the task requester.

4. The method of claim 1, wherein:
the crowdsourcing server limits a number of selected participants based on a task description provided by the task requester.

5. The method of claim 1, wherein:
a task performance result is submitted to the crowdsourcing server from one or more of the selected participants, and wherein the crowdsourcing server evaluates each submitted result based on prespecified task result criteria set by the task requester.

6. The method of claim 1, wherein:
the crowdsourcing server provides cloud computing services to each of the selected participants to process the virtual machine image to perform the particular task of developing the specified software component.

7. The method of claim 1, wherein:
a request for crowdsourcing associated with the particular task includes task request, participant request and computing environment request components.

8. In association with a particular task of developing a specified software component provided by a task requester, wherein the particular task of developing the specified software component is performed by a crowdsourcing process, a computer program product stored in a non-transitory computer readable storage medium, the computer program product comprising:

instructions for publishing the particular task of developing the specified software component to providers of software services;

instructions for receiving bids from the providers of software services to develop the specified software component;

instructions for selecting participants based on the received bids from the providers of software services to develop the specified software component, wherein each selected participant is qualified to perform the particular task of developing the specified software component;

instructions for specifying a computing environment that comprises a set of resources required to perform the particular task of developing the specified software component, wherein the computing environment includes an integrated software development environment and a test environment for the specified software component;

instructions for constructing a virtual machine image that contains each resource of the set of resources of the computing environment required to perform the particular task of developing the specified software component, wherein each selected participant requires specified data processing services to process the virtual machine image to perform the particular task of developing the specified software component, and wherein the specified data processing services are supplied at least in part to at least one of the selected participants by a cloud computing services provider, and wherein the virtual machine image is available to each of the selected participants at a platform operated by the cloud computing services provider;

instructions for handling contractual matters between the task requester and the selected participants to develop the specified software component; and instructions, responsive to receiving agreement on the contractual matters between the task requester and the selected participants to develop the specified software component, for making the virtual machine image available to the selected participants.

9. The computer program product of claim 8, wherein:
the virtual machine image is delivered to each of the selected participants.

10. The computer program product of claim 8, wherein:
a crowdsourcing server is associated with the task requester.

11. In association with a particular task of developing a specified software component provided by a task requester, wherein the particular task of developing the specified software component is performed by a crowdsourcing process, a data processing system comprising:

a bus system;

a storage device connected to the bus system, wherein the storage device stores instructions; and a processor connected to the bus system, wherein the processor executes the instructions to:

publish the particular task of developing the specified software component to providers of software services;

receive bids from the providers of software services to develop the specified software component;

select participants based on the received bids from the providers of software services to develop the specified software component, wherein each selected participant is qualified to perform the particular task of developing the specified software component;

specify a computing environment that comprises a set of resources required to perform the particular task of developing the specified software component, wherein the computing environment includes an integrated software development environment and a test environment for the specified software component;

construct a virtual machine image that contains each resource of the set of resources of the computing environment required to perform the particular task of developing the specified software component, wherein each selected participant requires specified data processing services to process the virtual machine image to perform the articular task of developing the specified software component and wherein the specified data processing services are supplied at least in part to at least one of the selected participants by a cloud computing services provider, and wherein the virtual machine image is available to each of the selected participants at a platform operated by the cloud computing services provider;

handle contractual matters between the task requester and the selected participants to develop the specified software component; and make the virtual machine image available to the selected participants to develop the specified software component in response to receiving agreement on the contractual matters between the task requester and the selected participants.

12. The data processing system of claim 11, wherein:
the virtual machine image is delivered to each of the selected participants.

13. The data processing system of claim 11, wherein:
the data processing system is associated with the task requester.

* * * * *